United States Patent
Bashir et al.

(10) Patent No.: US 12,036,492 B2
(45) Date of Patent: Jul. 16, 2024

(54) DYNAMIC HEATING MEDIA CONDITIONING FOR HEAT TRANSFER OPTIMIZATION AND FOULING CONTROL

(71) Applicant: Saudi Arabian Oil Company, Dhahran (SA)

(72) Inventors: Haider A. Bashir, Abqaiq (SA); Mubarak F. Al-Rashid, Kohbar (SA); Abdulrahman H Al-Swaidan, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 564 days.

(21) Appl. No.: 17/317,728

(22) Filed: May 11, 2021

(65) Prior Publication Data

US 2022/0364788 A1    Nov. 17, 2022

(51) Int. Cl.
    *B01D 3/42*    (2006.01)

(52) U.S. Cl.
    CPC ............ *B01D 3/42* (2013.01); *F25J 2280/50* (2013.01)

(58) Field of Classification Search
    CPC .... B01D 3/42; C10G 7/10; C10G 7/12; F22G 5/12; F25J 2280/50; F01K 17/02
    See application file for complete search history.

(56) References Cited

U.S. PATENT DOCUMENTS

| | | | |
|---|---|---|---|
| 6,375,803 B1 | 4/2002 | Razzaghi et al. | |
| 6,536,523 B1 | 3/2003 | Kresnyak et al. | |
| 7,972,482 B2 | 7/2011 | Strack et al. | |
| 2014/0144626 A1 | 5/2014 | Macadam | |

FOREIGN PATENT DOCUMENTS

| | | |
|---|---|---|
| CN | 200961850 Y | 10/2007 |
| CN | 101639703 A | 2/2010 |
| CN | 112569618 A | 3/2021 |
| JP | 65959284 A | 4/1984 |
| KR | 20160027454 A | 3/2016 |

OTHER PUBLICATIONS

International Search Report and Written Opinion in corresponding PCT Application No. PCT/US2022/072085, mailed Aug. 3, 2022; 9 pages.

*Primary Examiner* — Brian A McCaig
(74) *Attorney, Agent, or Firm* — Leason Ellis LLP

(57) ABSTRACT

An automated control loop for dynamically adjusting a temperature of wet steam is provided. This leads to increased heat transfer and decreased fouling in a reboiler of a distillation column used for distilling a petrochemical. The control loop includes controlling the combining of condensed water with dry steam to produce the wet steam. The produced wet steam is input to the reboiler in order to transfer heat to the petrochemical while being converted to the condensed water. The control loop further includes monitoring a pressure of the produced wet steam, and setting a target temperature for the produced wet steam based on the monitored pressure. In addition, the control loop includes monitoring the temperature of the produced wet steam, and adjusting a proportion of the condensed water in the produced wet steam in response to the monitored temperature deviating from the set target temperature by at least a threshold value.

19 Claims, 3 Drawing Sheets

Start
↓

310 Control combining of condensed water with dry steam to produce wet steam, which is input to reboiler in order to transfer heat to petrochemical while being converted to condensed water — Desuperheater 150

↓

320 Monitor pressure of produced wet steam — Pressure Sensor 162

↓

330 Set target temperature for produced wet steam based on monitored pressure — Control Circuit 190

↓

340 Monitor temperature of produced wet steam — Temperature Sensor 164

↓

350 In response to monitored temperature deviating from set target temperature by at least threshold value, adjust proportion of condensed water in produced wet steam in order to adjust monitored temperature so as to deviate from set target temperature by less than threshold value — Condensate Valve 180

↓

360 Vary target temperature directly with monitored pressure to dynamically adjust temperature of produced wet steam in order to increase heat transfer and decrease fouling in reboiler — Reboiler 130

↓

End

DYNAMIC HEATING MEDIA CONDITIONING FOR HEAT TRANSFER OPTIMIZATION AND FOULING CONTROL

FIELD OF THE DISCLOSURE

The present disclosure relates to techniques of dynamic heating media conditioning for heat transfer optimization and fouling control, such as for reboilers of a distillation column.

BACKGROUND OF THE DISCLOSURE

Condensing heating media (such as steam) are commonly used in processing facilities (such as oil refineries) to input heat into processes (such as reboilers on distillation columns). Conditioning of the heating media can help minimize the heat input from desuperheating the media while maximizing the heat input from condensing the media. This has a beneficial impact on the overall heat transfer coefficient. However, processes where the heating media parameters are dynamic may not be optimized by the use of fixed temperature desuperheaters.

It is in regard to these and other problems in the art that the present disclosure is directed to provide a technical solution for an effective automated control loop for dynamically adjusting the temperature of wet steam in order to increase heat transfer and decrease fouling in a reboiler.

SUMMARY OF THE DISCLOSURE

According to a first aspect of the disclosure, an automated control loop for dynamically adjusting a temperature of wet steam to increase heat transfer and decrease fouling in a reboiler of a distillation column for distilling a petrochemical is provided. The control loop comprises: controlling the combining of condensed water with dry steam to produce the wet steam, which is input to the reboiler in order to transfer heat to the petrochemical while being converted to the condensed water; monitoring a pressure of the produced wet steam; setting a target temperature for the produced wet steam based on the monitored pressure; and monitoring the temperature of the produced wet steam. Controlling the combining comprises, in response to the monitored temperature deviating from the set target temperature by at least a threshold value, adjusting a proportion of the condensed water in the produced wet steam in order to adjust the monitored temperature so as to deviate from the set target temperature by less than the threshold value. Setting the target temperature comprises varying the target temperature directly with the monitored pressure to dynamically adjust the temperature of the produced wet steam in order to increase the heat transfer and decrease the fouling in the reboiler.

In an embodiment consistent with the above, setting the target temperature comprises determining the saturation temperature of the produced wet steam from the monitored pressure, and using the determined saturation temperature to set the target temperature.

In an embodiment consistent with the above, setting the target temperature further comprises setting the target temperature to the determined saturation temperature plus a fixed amount.

In an embodiment consistent with the above, the fixed amount is 5° F.

In an embodiment consistent with the above, the control loop further comprises determining if the monitored pressure is within acceptable bounds, and setting the target temperature comprises: varying the target temperature directly with the monitored pressure when the monitored pressure is determined to be within the acceptable bounds; and not varying the target temperature directly with the monitored pressure when the monitored pressure is determined to be outside the acceptable bounds.

In an embodiment consistent with the above, not varying the target temperature directly with the monitored pressure comprises setting the target temperature to a predetermined amount.

In an embodiment consistent with the above, the predetermined amount is 325° F.

In an embodiment consistent with the above, the control loop further comprises generating an alert when the monitored pressure is determined to be outside the acceptable bounds for a predetermined period of time.

In an embodiment consistent with the above, adjusting the proportion of the condensed water comprises adjusting a control valve for controlling a return flow of the condensed water to combine with the dry steam, based on the deviation of the monitored temperature from the set target temperature.

In an embodiment consistent with the above, the petrochemical is crude oil.

According to another aspect of the disclosure, a control circuit to dynamically adjust a temperature of wet steam to increase heat transfer and decrease fouling in a reboiler of a distillation column for distilling a petrochemical is provided. The control circuit comprises: logic to control the combining of condensed water with dry steam to produce the wet steam, which is input to the reboiler in order to transfer heat to the petrochemical while being converted to the condensed water; logic to monitor a pressure of the produced wet steam; logic to set a target temperature for the produced wet steam based on the monitored pressure; and logic to monitor the temperature of the produced wet steam. The logic to control the combining comprises logic to, in response to the monitored temperature deviating from the set target temperature by at least a threshold value, adjust a proportion of the condensed water in the produced wet steam in order to adjust the monitored temperature so as to deviate from the set target temperature by less than the threshold value. The logic to set the target temperature comprises logic to vary the target temperature directly with the monitored pressure to dynamically adjust the temperature of the produced wet steam in order to increase the heat transfer and decrease the fouling in the reboiler.

In an embodiment consistent with the control circuit described above, the logic to set the target temperature comprises logic to determine the saturation temperature of the produced wet steam from the monitored pressure, and logic to use the determined saturation temperature to set the target temperature.

In an embodiment consistent with the control circuit described above, the control circuit further comprises logic to determine if the monitored pressure is within acceptable bounds, and the logic to set the target temperature comprises: logic to vary the target temperature directly with the monitored pressure when the monitored pressure is determined to be within the acceptable bounds; and logic to not vary the target temperature directly with the monitored pressure when the monitored pressure is determined to be outside the acceptable bounds.

In an embodiment consistent with the control circuit described above, the control circuit further comprises logic to generate an alert when the monitored pressure is determined to be outside the acceptable bounds for a predetermined period of time.

In an embodiment consistent with the control circuit described above, the logic to adjust the proportion of the condensed water comprises logic to adjust a control valve controlling a return flow of the condensed water combined with the dry steam, based on the deviation of the monitored temperature from the set target temperature.

According to yet another aspect of the disclosure, a non-transitory computer readable medium (CRM) having computer instructions stored therein that, when executed by a processing circuit, cause the processing circuit to carry out an automated process for dynamically adjusting a temperature of wet steam to increase heat transfer and decrease fouling in a reboiler of a distillation column for distilling a petrochemical, is provided. The process comprises: controlling the combining of condensed water with dry steam to produce the wet steam, which is input to the reboiler in order to transfer heat to the petrochemical while being converted to the condensed water; monitoring a pressure of the produced wet steam; setting a target temperature for the produced wet steam based on the monitored pressure; and monitoring the temperature of the produced wet steam. Controlling the combining comprises, in response to the monitored temperature deviating from the set target temperature by at least a threshold value, adjusting a proportion of the condensed water in the produced wet steam in order to adjust the monitored temperature so as to deviate from the set target temperature by less than the threshold value. Setting the target temperature comprises varying the target temperature directly with the monitored pressure to dynamically adjust the temperature of the produced wet steam in order to increase the heat transfer and decrease the fouling in the reboiler.

In an embodiment consistent with the CRM described above, setting the target temperature comprises determining the saturation temperature of the produced wet steam from the monitored pressure, and using the determined saturation temperature to set the target temperature.

In an embodiment consistent with the CRM described above, the process further comprises determining if the monitored pressure is within acceptable bounds, and setting the target temperature comprises: varying the target temperature directly with the monitored pressure when the monitored pressure is determined to be within the acceptable bounds; and not varying the target temperature directly with the monitored pressure when the monitored pressure is determined to be outside the acceptable bounds.

In an embodiment consistent with the CRM described above, the process further comprises generating an alert when the monitored pressure is determined to be outside the acceptable bounds for a predetermined period of time.

In an embodiment consistent with the CRM described above, adjusting the proportion of the condensed water comprises adjusting a control valve for controlling a return flow of the condensed water to combine with the dry steam, based on the deviation of the monitored temperature from the set target temperature.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIG. 3 is a flow diagram of an example automated process for dynamically adjusting the temperature of wet steam to increase heat transfer and decrease fouling in a reboiler of a distillation column, according to an embodiment.

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 1:
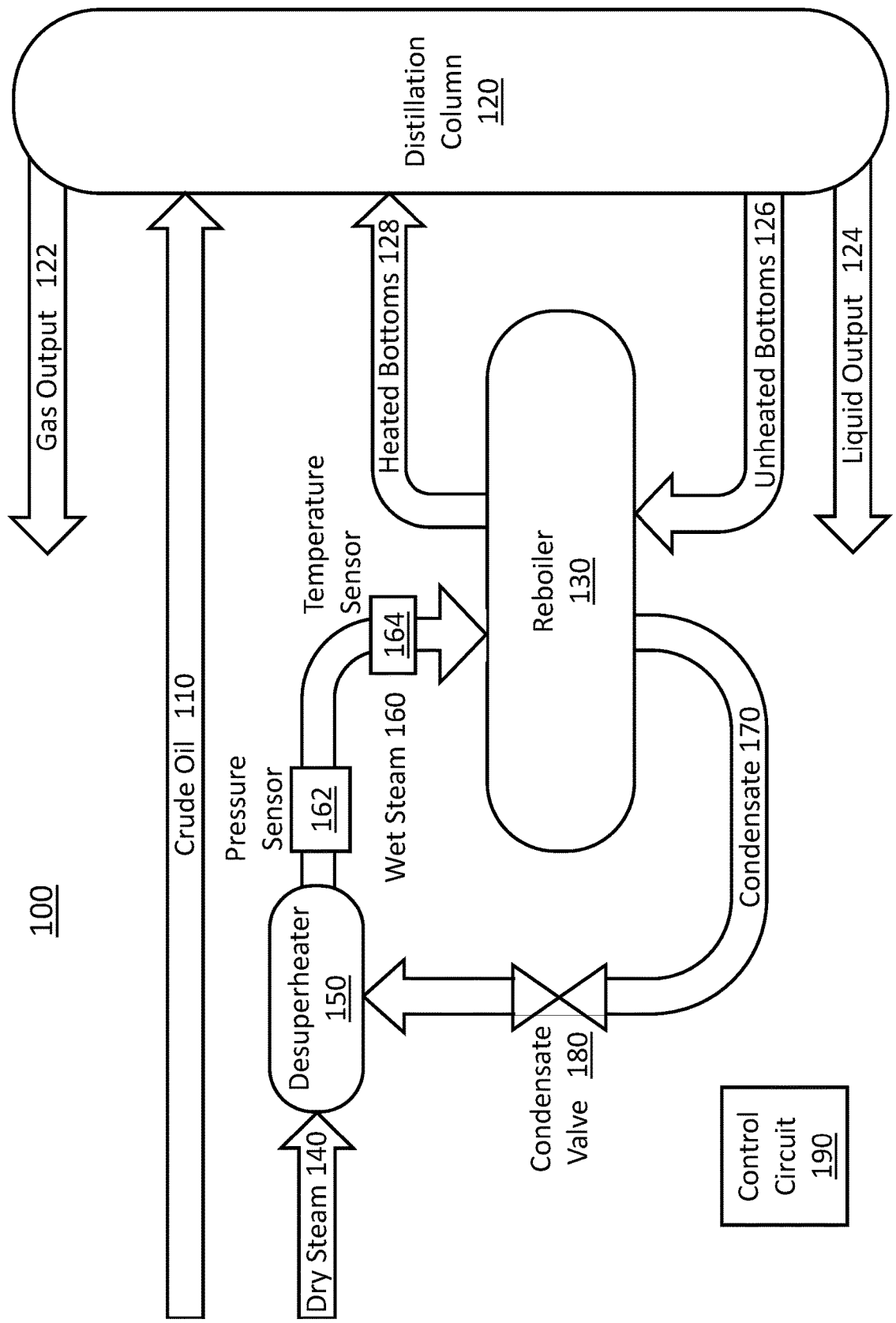
FIG. 1 is a schematic diagram of an example system for dynamically adjusting the temperature of wet steam to increase heat transfer and decrease fouling in a reboiler of a distillation column, according to an embodiment.

Example embodiments of the present disclosure are directed to techniques of dynamically controlling the conditioning of condensing heating media for maximizing heat transfer and controlling heat exchanger fouling. In some embodiments, the heating media is conditioned dynamically in response to changes to the process parameters of the heating media. In some embodiments, the conditioning is carried out using control logic that includes functions such as error minimization, saturation temperature determination, and setpoint correction and selection. In some such embodiments, this control logic is combined to identify the optimal temperature for the heating media and to cascade this identified temperature to the final control element in the field. In some embodiments, this conditioning allows the heating media to always be at the optimal temperature to maximize the heat transfer coefficient in the heat exchange equipment and also to ensure the heating media temperature is as low as feasible to reduce the fouling rate typically associated with higher temperature superheated heating media. Example embodiments of this disclosure can be applied to any heating service where a condensing heating media is used and where process parameters are dynamically changing over time. In some embodiments, the required heat exchange surface area is minimized, which provides for increased throughput (or duty) or less frequent maintenance (e.g., longer periods of operation at lower fouling rates).

Condensing heating media are routinely used in process facilities, such as crude oil refineries. They are often used in reboilers for distillation services (e.g., stabilizers, fractionators, strippers, to name a few) and are critical in meeting product specifications by ensuring adequate heat is added to the process for separation of components. The exchangers where this heating media is used can suffer from accelerated fouling in the absence of adequate conditioning. In some cases, this inadequate conditioning can limit processing throughput due to the loss of heat transfer resulting from factors such as fouling, low heat transfer coefficients, and the like. For example, when wet steam is the heating media, the steam pressure in the reboiler can vary significantly due to mostly uncontrollable factors. This can lead to inadequate or inefficient heat transfer and excessive fouling.

It is in regard to these and other problems that example embodiments of the present disclosure are directed to effective techniques for dynamically adjusting the temperature of the heating media in order to supply an optimal temperature that maximizes heat transfer while minimizing fouling. In some such embodiments, steam saturation is dynamically controlled to ensure maximum heat transfer efficiency as well as minimize the fouling rate in heat exchangers. In some such embodiments, heat transfer is optimized and fouling rates are reduced by ensuring the heating media is conditioned prior to entering the heat exchange equipment. In some such embodiments, desuperheaters are used to cool the heating media to the approximate range of saturation while dynamically adjusting the target saturation temperature to account for the dynamically changing heating media conditions. In some embodiments, the temperature setpoint is dynamically adjusted based on heating media conditions to continually achieve an optimal heating media temperature. In some such embodiments, error minimization logic is provided to prevent erroneous readings leading to unwanted temperatures, which helps to ensure abnormal temperature setpoints are not cascaded to the final control elements in the field. In some such embodiments, electronic logic components are programmed, customized, or otherwise configured to carry out the embodiments disclosed in this document.

Example embodiments are directed to control element logic programmed or otherwise configured to optimize the control of heating media temperature continuously and dynamically. These components (e.g., hardware, software running on computer components such as a microprocessor, or custom or customized logic, and the like) are configured to implement an overall control scheme and the logic functions required to enable dynamic control of heating media temperature. These components are further configured to implement logic blocks for minimizing the occurrence of erroneous values (e.g., target or setpoint temperatures) during the dynamic control of the heating media temperature. Example embodiments of these and other techniques are illustrated in FIGS. 1-3 and described in the text that follows.

Figure 2:
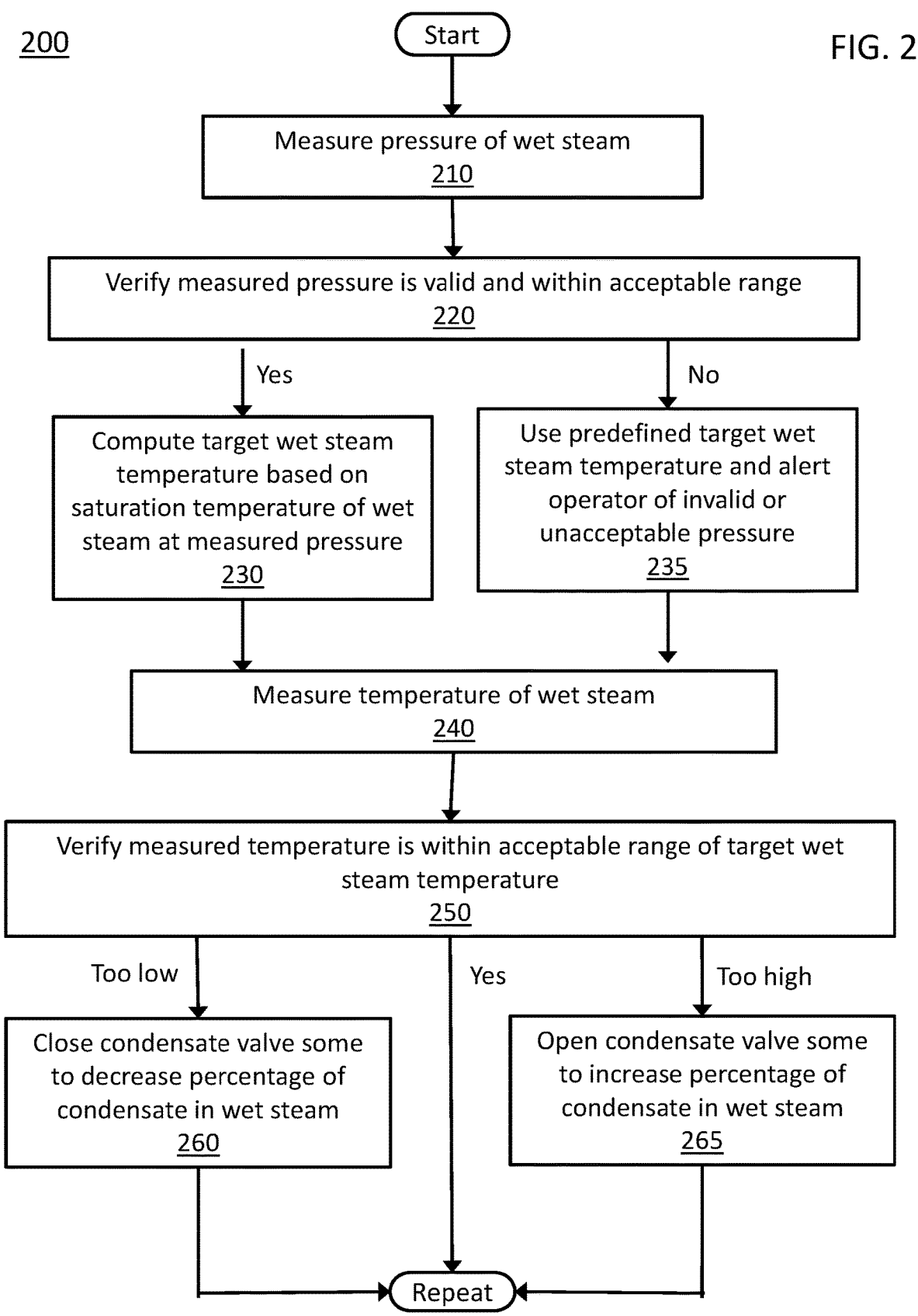
FIG. 2 is a flow diagram of an example automated control loop for dynamically adjusting the temperature of wet steam to increase heat transfer and decrease fouling in a reboiler of a distillation column, according to an embodiment.

FIG. 1 is a schematic diagram of an example system 100 for dynamically adjusting the temperature of wet steam 160 to increase heat transfer and decrease fouling in a reboiler 130 of a distillation column 120, according to an embodiment. Condensing heating media such as wet steam (for example, saturated steam or desuperheated steam) 160 are routinely used in processing industries (such as oil refining) to provide heat input to the processes.

The described techniques herein can be implemented as a control loop in a process facility using a combination of sensors, valves, cameras, and other devices including computing, control, or other logic circuits configured (e.g., programmed) to carry out their assigned tasks. These devices are located on or in (or otherwise in close proximity to) the distillation column or reboiler for carrying out the techniques. In some example embodiments, the control logic is implemented as computer code configured to be executed on a computing circuit (such as a microprocessor) to perform the control steps that are part of the technique.

In the system 100, crude oil 110 is delivered to the distillation column 120 (such as a fractionating column), which carries out a fractional distillation process using the reboiler 130 to heat the crude oil 110. This separates lower boiling point components (some of which exit from gas output 122 at the top of the distillation column 120) from higher boiling point components (some of which exit from liquid output 124 at the bottom of the distillation column 120). Much of the crude oil 110, however, recirculates through the distillation column 120 using the reboiler 130, refining the crude oil 110 in the process. In further detail, unheated bottoms fluid 126 is pulled from near the bottom of the distillation column 120. The unheated bottoms fluid 126 is reheated in the reboiler 130 and returned as heated bottoms fluid 128 near the middle or upper portion of the distillation column 120. In some embodiments, the reboiler 130 is a thermosiphon reboiler, and the recirculating of the bottoms fluid takes place as a thermosiphon process.

The reboiler 130 heats the bottoms fluid 126 by transferring heat from a heating media (such as water, as in wet steam 160) to the bottoms fluid 126 within the reboiler 130. The reboiler 130 is built to provide physical separation of two fluids (e.g., bottoms fluid 126 and wet steam 160) while also providing a large amount of surface contact (such as through a separation surface like a metal wall) between the fluids. The separation surface (such as metal) transfers heat well, allowing the heat to exchange between the two fluids, with the hotter fluid (wet steam 160) cooling and the cooler fluid (bottoms fluid 126) heating. The cooled wet steam 160 exits the reboiler 130 from the bottom as condensed water (or condensate) 170 while the heated bottoms fluid 128 exits the reboiler 130 from the top (e.g., pulling in more unheated bottoms fluid 126 from the bottom as part of the thermosiphon process).

To make the heating media transfer heat efficiently, it needs to be in the proper temperature and state. For water, wet steam (saturated steam) works best, as it has the highest heat transfer rate or heat transfer coefficient. In a typical reboiler, wet steam has about three times the heat transfer rate (coefficient) as condensate (condensed water, or liquid water), which in turn has about four times the heat transfer coefficient as dry steam (superheated steam). This also means wet steam has about 12 times the heat transfer coefficient as dry steam. Accordingly, the reboiler 130 should always be provided with wet steam 160 as the heating media, and dry steam should always be avoided. This can be provided by ensuring that the temperature of the wet steam is sufficiently above the saturation (boiling) point that it will remain wet steam throughout the reboiler 130, and turning into condensate on its exit from the reboiler. In addition, the temperature of the wet steam 160 should be sufficiently below that of the superheating point (e.g., when wet steam becomes dry steam) that there is little chance of losing heat transfer coefficient by inadvertently introducing dry steam into the reboiler 130. Further, the temperature of the wet steam 160 should be as close to the saturation point as possible to minimize fouling of the reboiler (heating media fouling increases with high temperature heating media).

With these in mind, dry steam is very efficient for steam power, and for transport of the steam. Accordingly, in the system 100, dry steam 140 is provided as a heat source, and a desuperheater 150 is provided as a device that converts the dry steam 140 to the wet steam 160. This is accomplished as part of a thermal control loop that mixes the condensate 170 exiting the reboiler 130 with the dry steam 140 supplied as the heat source to the system 100. To that end, in the system 100, a pressure sensor 162 and a temperature sensor 164 are provided to measure the pressure and temperature, respectively, of the produced wet steam 160 from the desuperheater 150. In addition, a condensate valve 180 is provided to regulate the amount of condensate 170 mixed with the dry steam 140 in the desuperheater 150. Further, a control circuit 190 is provided and configured (e.g., by code, custom logic, customizable logic, or the like) to control the control loop by monitoring the measured pressure and temperature of the wet steam 160, and adjusting the condensate valve 180 appropriately to achieve the desired temperature of the wet steam 160, such as several degrees (e.g., 5° F.) above the saturation point of the wet steam 160.

In one possible such control loop, the control circuit is programmed (or otherwise configured) to control the desuperheater to maintain the wet steam at a fixed setpoint (constant temperature), which it tries to maintain by control of the condensate valve 180. However, in processes where the heating media conditions dynamically change (such as pressure), a fixed setpoint does not yield the optimal temperature. For instance, pressure affects the saturation point of the wet steam 160, with higher pressure raising the saturation point, and lower pressure lowering the saturation point. This can lead to undesired condensate 170 in the reboiler 130 (e.g., if the pressure is too high) or undesired fouling in the reboiler (e.g., if the pressure is too low).

Accordingly, in example embodiments, the control circuit 190 is programmed to control the temperature of the wet steam 160 (e.g., through control of the condensate valve 180 in response to the measured pressure and temperature of the wet steam 160 from pressure sensor 162 and temperature sensor 164, respectively) to be as close to saturation as possible. In some such embodiments, the control circuit 190 is programmed to factor in maximizing the heat transfer coefficient as a primary goal, and subsequently either maximize throughput through the reboiler or minimize maintenance outages in the reboiler (e.g., due to lower fouling rates).

FIG. 2 is a flow diagram of an example automated control loop 200 for dynamically adjusting the temperature of wet steam to increase heat transfer and decrease fouling in a reboiler of a distillation column, according to an embodiment. For example, the control loop 200 can be implemented on the control circuit 190 using the system 100 of FIG. 1. For ease of description, the operations of the control loop 200 may be described as a series of actions, but they are implemented in an autonomous manner, such as a control circuit programmed or otherwise configured to carry out or control the different actions. It should be noted that the control loop 200 is continuous. While execution proceeds broadly from top to bottom, it is a loop that continuously wraps from the bottom back to the top. The control circuit is programmed to dynamically control the heating media (primarily its temperature) to optimize heat transfer in the reboiler.

Broadly speaking, in some embodiments, loops such as the control loop 200 allow for improved or optimal dynamic temperature adjustment of the heating media in dynamically changing processes. The basic concept includes the adjustment of the heating media temperature based on an assessment of the process conditions of the utility stream. For instance, in the control loop 200, control begins with the operation of measuring 210 the pressure of the wet steam (such as wet steam 160, as measured by pressure sensor 162). The control loop 200 further includes the operation of verifying 220 that the measured pressure is valid and within an acceptable range, such as between 55 and 80 pounds per square inch (psi). The operation 220 serves as an error minimization function (EMF): In some more general embodiments, this logic function verifies process parameters are healthy (e.g., valid) and are within prescribed design ranges to ensure erroneous setpoints are not calculated or utilized. This ensures smooth and robust dynamic control even when confronted with faulty, anomalous, or unusual sensor readings.

To this end, the control loop 200 includes the operation of using 235 a predefined target wet steam temperature, such as 325° F., when the measured pressure is invalid or outside acceptable boundaries. In addition, an alert is generated (such as an operator alert) of the condition, so that it can be diagnosed and any necessary or corrective actions taken. The operation 235 thus serves as an operator notification function (ONF), where an error exists in determining the optimal setpoint temperature, the control room operator is notified, and a safe setpoint is selected. In some embodiments, the operator notification does not take place until the faulty or unacceptable temperature has been detected for at least a set or predetermined period of time (such as five minutes or an hour). This, for example, can allow time for the system to stabilize (e.g., during startup or transition) or the temperature to start being reported as normal before operators are expected to intervene.

On the other hand, when the measured pressure is valid and within the acceptable range, the control loop 200 includes the step of computing 230 the target wet steam temperature based on the saturation temperature of the wet steam at the measured pressure. The operation 230 serves as a saturation temperature determination (TSS or saturation temperature setting): Broadly speaking, this logic function determines the saturation temperature of the heating media given the process parameters associated with the condition of the heating media. For instance, the saturation temperature of the wet steam varies directly with the measured pressure, in that the saturation temperature rises as the pressure rises, and falls as the pressure falls. The control circuit implementing the control loop 200 is programmed to calculate, look up, or otherwise closely approximate this direct relationship, and returns the saturation temperature of the wet steam as a function of the measured pressure of the wet steam.

While the saturation temperature of the wet steam is the ideal target temperature, the wet steam loses temperature as it passes through the reboiler (and other plumbing before the reboiler). As such, the wet steam can become condensed water in (or before) the reboiler if the target temperature is set too low. Normal measurement inaccuracies of the wet steam temperature can also lead the target temperature to be set too low. Accordingly, the control circuit is further programmed to increment the saturation temperature by a fixed amount, such as 5° F., when setting the target wet steam temperature to account for factors such as expected heat loss prior to exiting the reboiler or temperature measurement inaccuracies. As such, the operation 230 further serves as a set-point correction (SCF or setpoint correction function), where the determined saturation temperature is adjusted to account for factors such as heat loss and measurement inaccuracy of the wet steam.

In some embodiments, as a still further safeguard, the final target temperature is compared to a range of normal operating temperatures before being selected. In one such embodiment, the target temperature is compared to a maximum temperature, such as 335° F., and if it is greater, then the setpoint is set to a default temperature, such as 325° F. As such, the operation 230 further serves as a temperature selection function (TSF): This logic function further manipulates the setpoint temperature by ensuring the desired setpoint is within logical bounds. The setpoint correction is adjustable since it can be specific to actual site conditions, such as length, size, and type of piping, insulation conditions, reboiler efficiency, presence of steam traps, to name a few.

At this point, the target temperature setpoint has been determined, so the control loop 200 controls the performing of the feedback mechanism, such as a proportional integral derivative (PID) loop to regulate the temperature of the wet steam based on its pressure. To this end, the control loop 200 continues with the operation of measuring 240 the temperature of the wet steam, such as with temperature sensor 164. This is followed by the operation of verifying 250 that the measured temperature is within an acceptable range, such as plus or minus a couple (e.g., 2 or 3) of degrees Fahrenheit (° F.), of the target wet steam temperature. If so, then the temperature is being regulated properly, so the control loop repeats.

On the other hand, if the measured temperature is too low (i.e., the wet steam is too cool) compared to the setpoint, the control loop 200 includes the operation of closing 260 the condensate return valve (such as condensate value 180) some in order to raise the temperature of the wet steam output by the desuperheater. That is, if less condensate is added to the mixture, then the condensate makes up a smaller fraction of the mixture, so the significantly hotter dry steam exerts a greater control of the temperature of the wet steam. In some embodiments, as part of the PID control loop, the amount of closing of the condensate valve varies (such as proportional to, or varies linearly) with the temperature difference between the setpoint temperature and the measured temperature. This feedback causes a quicker return to equilibrium of the setpoint temperature and the measured temperature. The control loop 200 then repeats to achieve the optimal temperature for the wet steam.

Conversely, if the measured temperature is too high (i.e., the wet steam is too hot) compared to the setpoint, the control loop 200 includes the operation of opening 265 the condensate return valve (such as condensate value 180) some in order to lower the temperature of the wet steam output by the desuperheater. That is, if more condensate is added to the mixture, then the dry steam makes up a smaller fraction of the mixture, so the significantly cooler condensate exerts a greater control of the temperature. In some embodiments, as part of the PID control loop, the amount of opening of the condensate valve varies (such as proportional to, or varies linearly) with the temperature difference between the measured temperature and the setpoint temperature. This feedback causes a quicker return to equilibrium of the setpoint temperature and the measured temperature. The control loop 200 then repeats to achieve the optimal temperature for the wet steam:

FIG. 3 is a flow diagram of an example automated process 300 for dynamically adjusting the temperature of wet steam (such as wet steam 160) to increase heat transfer and decrease fouling in a reboiler (such as reboiler 130) of a distillation column (such as distillation column 120), according to an embodiment. The distillation column is for distilling a petrochemical, such as crude oil 110. The reboiler heats the petrochemical as part of a distillation process, using the wet steam as the source of heat. The process 300 is automated under the control of an electronic circuit (such as control circuit 190), which is configured (e.g., by code, such as programmed, by custom logic, as in configurable logic gates, or the like) to carry out the steps of the process 300.

Some or all of the process 300 can be performed using components and techniques illustrated in FIGS. 1-2. In addition, portions of this and other methods or processes disclosed herein can be performed on or using process control logic, such as custom or preprogrammed control logic devices, circuits, or processors, such as a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause portions of the process 300 (or other disclosed method or process) to be carried out. It should be noted that in other embodiments, the order of the operations can be varied, and that some of the operations can be omitted. Some of the process 300 can also be performed using logic, circuits, or processors located on or in electrical communication with a processing circuit configured by code to carry out these portions of the process 300.

In the process 300, processing begins with the step of controlling 310 the combining of condensed water (such as condensate 170) with dry steam (such as dry steam 140) to produce the wet steam (such as in desuperheater 150), which is input to the reboiler in order to transfer heat to the petrochemical while being converted to the condensed water. The process 300 further includes the step of monitoring 320 a pressure (such as with pressure sensor 162) of the produced wet steam, and the step of setting 330 a target temperature (such as a setpoint) for the produced wet steam based on the monitored pressure. This can be done, for example, by following the operations of the control loop 200 (in particular, operation 230) as controlled by the control circuit 190. In addition, the process 300 includes the step of monitoring 340 the temperature (such as with temperature sensor 164) of the produced wet steam.

Further, the process 300 (in particular, the step of controlling 310 the combining of the condensed water with the dry steam) includes the step of, in response to the monitored temperature deviating from the set target temperature by at least a threshold value (such as a few ° F.), adjusting 350 a proportion of the condensed water (such as with condensate valve 180) in the produced wet steam in order to adjust the monitored temperature so as to deviate from the set target temperature by less than the threshold value. This can be done, for example, by following the operations of the control loop 200 (in particular, operations 260 and 265) as controlled by the control circuit 190. In addition, the process 300 (in particular, the step of setting 330 the target temperature for the produced wet steam) includes the step of varying 360 the target temperature directly with the monitored pressure to dynamically adjust the temperature of the produced wet steam in order to increase the heat transfer and decrease the fouling in the reboiler. This can be done, for example, by keeping the target temperature only enough above the saturation point that the wet steam does not condense in the reboiler, as described in the operations of control loop 200 (in particular, operation 230) and as controlled by the control circuit 190.

In an embodiment, the step of setting 330 the target temperature includes the steps of determining the saturation temperature of the produced wet steam from the monitored pressure, and using the determined saturation temperature to set the target temperature, such as adding a small amount (for example, 5° F.) to the determined saturation temperature. In some embodiments, the process further includes the step of determining if the monitored pressure is within acceptable bounds, and the step of setting 330 the target temperature includes the steps of varying the target temperature directly with the monitored pressure when the monitored pressure is determined to be within the acceptable bounds, and not varying the target temperature directly with the monitored pressure (such as setting the target temperature to a default temperature, like 325° F.) when the monitored pressure is determined to be outside the acceptable bounds. In one such embodiment, the process further includes the step of generating an alert when the monitored pressure is determined to be outside the acceptable bounds for a predetermined period of time (such as five minutes or an hour).

In an embodiment, the step of adjusting 350 the proportion of the condensed water in the wet steam includes the step of adjusting a control valve (such as condensate valve 180) for controlling a return flow of the condensed water to combine with the dry steam, based on the deviation of the monitored temperature from the set target temperature. See, for example, the operations of control loop 200 (in particular, operations 260 and 265) as one way to carry out this step under control of the control circuit 190.

Any of the methods described herein may, in corresponding embodiments, be reduced to a non-transitory computer readable medium (CRM) having computer instructions stored therein that, when executed by a processing circuit, cause the processing circuit to carry out an automated process for performing the respective methods.

The methods described herein may be performed in whole or in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An automated control loop for dynamically adjusting a temperature of wet steam to increase heat transfer and decrease fouling in a reboiler of a distillation column for distilling a petrochemical, the control loop comprising:
    logic to control a combining of condensed water with dry steam to produce the wet steam, which is input to the reboiler in order to transfer heat to the petrochemical while being converted to the condensed water;
    logic to monitor a pressure of the produced wet steam;
    logic to set a target temperature for the produced wet steam based on the monitored pressure; and
    logic to monitor the temperature of the produced wet steam,
    wherein the logic to control the combining includes logic to adjust the monitored temperature, in response to the monitored temperature deviating from the set target temperature by at least a threshold value, wherein the logic to adjust adjusts a proportion of the condensed water in the produced wet steam in order to adjust the monitored temperature so as to deviate from the set target temperature by less than the threshold value, and
    wherein the logic to set the target temperature includes logic to vary the target temperature directly with the monitored pressure to dynamically adjust the temperature of the produced wet steam in order to increase the heat transfer and decrease the fouling in the reboiler.

2. The automated control loop of claim 1, wherein the logic to set the target temperature includes logic to determine a saturation temperature of the produced wet steam from the monitored pressure, and to use the determined saturation temperature to set the target temperature.

3. The automated control loop of claim 2, wherein the logic to set the target temperature sets the target temperature to the determined saturation temperature plus a fixed amount.

4. The automated control loop of claim 3, wherein the fixed amount is 5° F.

5. The automated control loop of claim 1, further comprising logic to determine if the monitored pressure is within acceptable bounds, wherein the logic to set the target temperature comprises:
    logic to vary the target temperature directly with the monitored pressure when the monitored pressure is determined to be within the acceptable bounds; and
    logic to not vary the target temperature directly with the monitored pressure when the monitored pressure is determined to be outside the acceptable bounds.

6. The automated control loop of claim 5, wherein the logic to not vary sets the target temperature to a predetermined amount.

7. The automated control loop of claim 6, wherein the predetermined amount is 325° F.

8. The automated control loop of claim 5, further comprising logic to generate an alert when the monitored pressure is determined to be outside the acceptable bounds for a predetermined period of time.

9. The automated control loop of claim 1, wherein the logic to adjust adjusts a control valve for controlling a return flow of the condensed water to combine with the dry steam, based on the deviation of the monitored temperature from the set target temperature.

10. A control circuit to dynamically adjust a temperature of wet steam to increase heat transfer and decrease fouling in a reboiler of a distillation column for distilling a petrochemical, the control circuit comprising:
   logic to control a combining of condensed water with dry steam to produce the wet steam, which is input to the reboiler in order to transfer heat to the petrochemical while being converted to the condensed water;
   logic to monitor a pressure of the produced wet steam;
   logic to set a target temperature for the produced wet steam based on the monitored pressure; and
   logic to monitor the temperature of the produced wet steam,
   wherein the logic to control the combining comprises logic to, in response to the monitored temperature deviating from the set target temperature by at least a threshold value, adjust a proportion of the condensed water in the produced wet steam in order to adjust the monitored temperature so as to deviate from the set target temperature by less than the threshold value, and
   wherein the logic to set the target temperature comprises logic to vary the target temperature directly with the monitored pressure to dynamically adjust the temperature of the produced wet steam in order to increase the heat transfer and decrease the fouling in the reboiler.

11. The control circuit of claim 10, wherein the logic to set the target temperature comprises logic to determine the saturation temperature of the produced wet steam from the monitored pressure, and logic to use the determined saturation temperature to set the target temperature.

12. The control circuit of claim 10, further comprising logic to determine if the monitored pressure is within acceptable bounds, wherein the logic to set the target temperature comprises:
   logic to vary the target temperature directly with the monitored pressure when the monitored pressure is determined to be within the acceptable bounds; and
   logic to not vary the target temperature directly with the monitored pressure when the monitored pressure is determined to be outside the acceptable bounds.

13. The control circuit of claim 12, further comprising logic to generate an alert when the monitored pressure is determined to be outside the acceptable bounds for a predetermined period of time.

14. The control circuit of claim 10, wherein the logic to adjust the proportion of the condensed water comprises logic to adjust a control valve controlling a return flow of the condensed water combined with the dry steam, based on the deviation of the monitored temperature from the set target temperature.

15. A non-transitory computer readable medium (CRM) having computer instructions stored therein that, when executed by a processing circuit, cause the processing circuit to carry out an automated process for dynamically adjusting a temperature of wet steam to increase heat transfer and decrease fouling in a reboiler of a distillation column for distilling a petrochemical, the process comprising:
   controlling a combining of condensed water with dry steam to produce the wet steam, which is input to the reboiler in order to transfer heat to the petrochemical while being converted to the condensed water;
   monitoring a pressure of the produced wet steam;
   setting a target temperature for the produced wet steam based on the monitored pressure; and
   monitoring the temperature of the produced wet steam,
   wherein controlling the combining comprises, in response to the monitored temperature deviating from the set target temperature by at least a threshold value, adjusting a proportion of the condensed water in the produced wet steam in order to adjust the monitored temperature so as to deviate from the set target temperature by less than the threshold value, and
   wherein setting the target temperature comprises varying the target temperature directly with the monitored pressure to dynamically adjust the temperature of the produced wet steam in order to increase the heat transfer and decrease the fouling in the reboiler.

16. The non-transitory CRM of claim 15, wherein setting the target temperature comprises determining the saturation temperature of the produced wet steam from the monitored pressure, and using the determined saturation temperature to set the target temperature.

17. The non-transitory CRM of claim 15, wherein the process further comprises determining if the monitored pressure is within acceptable bounds, and setting the target temperature comprises:
   varying the target temperature directly with the monitored pressure when the monitored pressure is determined to be within the acceptable bounds; and
   not varying the target temperature directly with the monitored pressure when the monitored pressure is determined to be outside the acceptable bounds.

18. The non-transitory CRM of claim 17, wherein the process further comprises generating an alert when the monitored pressure is determined to be outside the acceptable bounds for a predetermined period of time.

19. The non-transitory CRM of claim 15, wherein adjusting the proportion of the condensed water comprises adjusting a control valve for controlling a return flow of the condensed water to combine with the dry steam, based on the deviation of the monitored temperature from the set target temperature.

* * * * *